(12) United States Patent
Boeuf et al.

(10) Patent No.: US 9,207,866 B2
(45) Date of Patent: Dec. 8, 2015

(54) CHUNK-LEVEL CLIENT SIDE ENCRYPTION IN HIERARCHICAL CONTENT ADDRESSABLE STORAGE SYSTEMS

(71) Applicant: upthere, inc., Palo Alto, CA (US)

(72) Inventors: Julien Boeuf, Palo Alto, CA (US); Sachin Rawat, San Francisco, CA (US)

(73) Assignee: upthere, inc., Palo Alto, CA (US)

( * ) Notice: Subject to any disclaimer, the term of this patent is extended or adjusted under 35 U.S.C. 154(b) by 286 days.

(21) Appl. No.: 13/947,409

(22) Filed: Jul. 22, 2013

(65) Prior Publication Data

US 2015/0026454 A1    Jan. 22, 2015

(51) Int. Cl.
*H04L 29/06* (2006.01)
*G06F 3/06* (2006.01)
*G06F 12/02* (2006.01)
*G06F 17/30* (2006.01)

(52) U.S. Cl.
CPC ............ *G06F 3/0607* (2013.01); *G06F 3/0631* (2013.01); *G06F 3/0683* (2013.01); *H04L 63/168* (2013.01); *G06F 12/02* (2013.01); *G06F 17/30067* (2013.01)

(58) Field of Classification Search
CPC ... G06F 3/0607; G06F 3/0631; G06F 3/0683; G06F 17/30067; G06F 12/02; H04L 63/168
USPC ................................. 713/152, 167
See application file for complete search history.

(56) References Cited

U.S. PATENT DOCUMENTS

| | | | |
|---|---|---|---|
| 7,535,485 B2 | 5/2009 | Elbaz et al. | |
| 8,156,429 B2 | 4/2012 | Lotenberg | |
| 8,223,191 B2 | 7/2012 | Elbaz et al. | |
| 2002/0073326 A1* | 6/2002 | Fontijn | 713/190 |
| 2006/0015945 A1* | 1/2006 | Fields | 726/27 |
| 2010/0058054 A1 | 3/2010 | Irvine | |
| 2010/0064354 A1 | 3/2010 | Irvine | |
| 2010/0070698 A1 | 3/2010 | Ungureanu et al. | |
| 2011/0010578 A1 | 1/2011 | Dominguez et al. | |
| 2011/0264871 A1 | 10/2011 | Koifman et al. | |

(Continued)

FOREIGN PATENT DOCUMENTS

| | | |
|---|---|---|
| CN | 101303669 A | 11/2008 |
| CN | 103294610 A | 9/2013 |
| JP | H0934791 A | 7/1997 |

OTHER PUBLICATIONS

U.S. Appl. No. 13/622,026, filed Sep. 18, 2012, Notice of Allowance.

(Continued)

*Primary Examiner* — Amare F Tabor
(74) *Attorney, Agent, or Firm* — Hickman Palermo Becker Bingham LLP (57) ABSTRACT

Techniques for chunk-level client side encryption are provided. In a content addressable storage system, a plurality of chunks is used to implement a hierarchical file system. The hierarchical file system supports both encrypted and non-encrypted volumes. A folders and files layer makes calls directly to a chunk system layer for operations involving non-encrypted volumes. The folders and files layer makes calls to a volume encryption layer for operations involving encrypted volumes. The volume encryption layer receives calls from the folders and files layer through an API that matches the API through which the chunk system layer receives calls from the folders and files layer.

32 Claims, 7 Drawing Sheets

(56) References Cited

U.S. PATENT DOCUMENTS

| | | | |
|---|---|---|---|
| 2011/0307447 A1 | 12/2011 | Sabaa et al. | |
| 2012/0173882 A1* | 7/2012 | Horn et al. | 713/189 |
| 2012/0210120 A1 | 8/2012 | Irvine | |
| 2012/0215980 A1 | 8/2012 | Auchmoody et al. | |
| 2012/0221524 A1 | 8/2012 | Auchmoody et al. | |
| 2012/0300676 A1 | 11/2012 | Welin et al. | |
| 2012/0311339 A1 | 12/2012 | Irvine | |
| 2013/0054977 A1* | 2/2013 | Basmov et al. | 713/189 |
| 2013/0061049 A1 | 3/2013 | Irvine | |
| 2013/0198462 A1 | 8/2013 | Serlet et al. | |
| 2013/0198475 A1 | 8/2013 | Serlet et al. | |
| 2014/0025948 A1* | 1/2014 | Bestler et al. | 713/167 |

OTHER PUBLICATIONS

"Convergent encryption", Wikipedia, available: http://en.wikipedia.org/wiki/Convergent_encryption, retrieved May 23, 2013.

"Designing Rhino DHT—A fault tolerant, dynamically distributed, hash table—Ayende@ . . . " http:/web.archive.org/web// 20120122041007/http:/ayende.com/blog/3934/designing-rhino- . . . 2009 (9 pages).

Zhao, J. et al., "Achieving Reliability Through Reputation in a Wide-Area Network PHT Storage System" 2007 (8 pages).

"Distributed Hash Table—Wikipedia, the free encyclopedia" downloaded from the Internet: http://web.archive.org/web/ 20120103125147/http:/en.wikipedia.org/wiki/Distributed hash . . . Dec. 2011 (5 pages).

Ghemawat, Sanjay, "The Google File System", dated Oct. 2003, ACM, 15 pages.

U.S. Appl. No. 13/622,026, filed Sep. 18, 2012, Office Action, Sep. 29, 2014.

The State Intelletual Property Office of the People's Republic of China, "Search Report" in application No. 2013100325456, dated May 26, 2015, 5 pages.

Claims in China application No. 2013100325456, dated May 2015, 4 pages.

* cited by examiner

CHUNK-LEVEL CLIENT SIDE ENCRYPTION IN HIERARCHICAL CONTENT ADDRESSABLE STORAGE SYSTEMS

CROSS-REFERENCE TO RELATED APPLICATIONS; BENEFIT CLAIM

This application is related to U.S. patent application Ser. No. 13/358,742, filed Jan. 26, 2012, and to U.S. patent application Ser. No. 13/622,026, filed Sep. 18, 2012, the entire contents of which are hereby incorporated by reference as if fully set forth herein.

FIELD OF THE INVENTION

The present invention relates to storage systems and, more specifically, to techniques for chunk-level client side encryption in hierarchical content addressable storage systems.

BACKGROUND

Information that is used to access a stored digital item is referred to herein as the "access key" of the stored item. In typical file systems, stored items are retrieved based on (a) the location at which the items are stored, and (b) a name or identifier of the items. For example, if a file named "foo.txt" is located in a directory named "c:\myfiles\text", then applications may use the pathname "c:\myfiles\text\foo.txt" as the access key to retrieve the file from the file system. Because conventional access keys are based on the location of the items being retrieved, the access keys change when the items are moved. In addition, each copy of an item has a different access key, because each copy is stored at a different location.

In contrast to conventional file systems, Content Addressable Storage (CAS) systems allow applications to retrieve items from storage based on a hash value that is generated from the content of the items. Because CAS systems perform storage-related operations on items based on the hash values generated for the items, and the hash values are based on the content of the items rather than where the items are stored, the applications that request the operations may do so without knowing the number or location of the stored copies of the items. For example, a CAS system may store multiple copies of an item X at locations A, B and C. An application that desires to retrieve item X would do so by sending to the CAS system a hash value that is based on the contents of item X. Based on that hash value, the CAS system would provide to the application a copy of item X retrieved from one of the locations A, B, and C. Thus, the application would obtain item X without knowing where item X was actually stored, how many copies of item X existed, or the specific location from which the retrieved copy was actually obtained.

Storing a digital item, such as a file or a message, involves making one or more calls to a "chunk storage system". A chunk storage system is a storage system that performs storage operations without understanding the format or content of the digital information itself. Such storage systems are referred to as chunk storage systems because the systems treat all forms of digital items as if those items were merely opaque chunks of data. For example, the same chunk storage system may be used by word processing applications, image management applications, and calendaring systems to respectively store documents, images and appointments. However, from the perspective of the chunk storage system, only one type of item is being stored: opaque chunks of digital information.

Chunk storage systems may be implemented as CAS systems. For example, a chunk storage system may generate a hash value for a chunk by applying a cryptographic hash function (e.g. MD5, SHA-1 or SHA2) to the chunk. The chunk store may then store the chunk, and maintain an index that associates the hash value with the location at which the chunk is stored.

When an application subsequently requests retrieval of the chunk, the application provides the hash value to the chunk storage system. The chunk storage system uses the index to locate the chunk associated with the hash value, and provides the chunk thus located to the requesting application.

Chunks may be used to represent a file system hierarchy, where some chunks correspond to folders/directories of the file system hierarchy, and other chunks correspond to files that are stored in those folders/directories. It is also possible for any given chunk or sub-tree of chunks to belong to multiple trees within the hierarchy.

Encryption is used to secure data and/or metadata. In a chunk storage system implemented as a CAS system, one solution is to perform the encryption operation on the chunk store server. However, a successful attack could expose all the data stored in the chunk store server. Furthermore, such a solution may cause potentially significant modifications and/or overhead to configure the server to perform encryption and decryption operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques for chunk-level client side encryption are provided. In a content addressable storage system, a plurality of chunks is used to implement a hierarchical file system. The hierarchical file system may be configured to support both encrypted and non-encrypted volumes. A folders and files layer makes calls directly to a chunk system layer for operations involving non-encrypted volumes. The folders and files layer makes calls to a volume encryption layer for operations involving encrypted volumes. The volume encryption layer receives calls from the folders and files layer through an API that matches the API through which the chunk system layer receives calls from the folders and files layer.

Data protection is performed at the chunk level for a given encrypted volume. In one embodiment, an encrypted volume includes a plurality of chunks stored in a hash tree. The encrypted volume may be accessed and/or shared using one or more authorization and key distribution schemes.

As used herein, the notation below refers to:
E(K, M)—the encryption of data M with encryption key K;
D(K, N)—the decryption of cipher-text data N with encryption key K;
h(X)—the one-way hash of data X;
CK—chunk key (the key used to encrypt a chunk);
VK—volume key (the key used to encrypt data related to a particular volume);
ID(VK)—an identifier of a volume key VK;
VS—volume state;
VID—volume identifier;
$K_E$—key associated with an entity E;
RC—root chunk of an encrypted volume; and
$C_{CT}$—clear-text chunk data of chunk C; and
$C_E$—encrypted chunk data of chunk C; $C_E$ is equivalent to E(K, $C_{CT}$), where K is determined based on the encryption scheme applied to the chunk C.

System Overview

Figure 1:
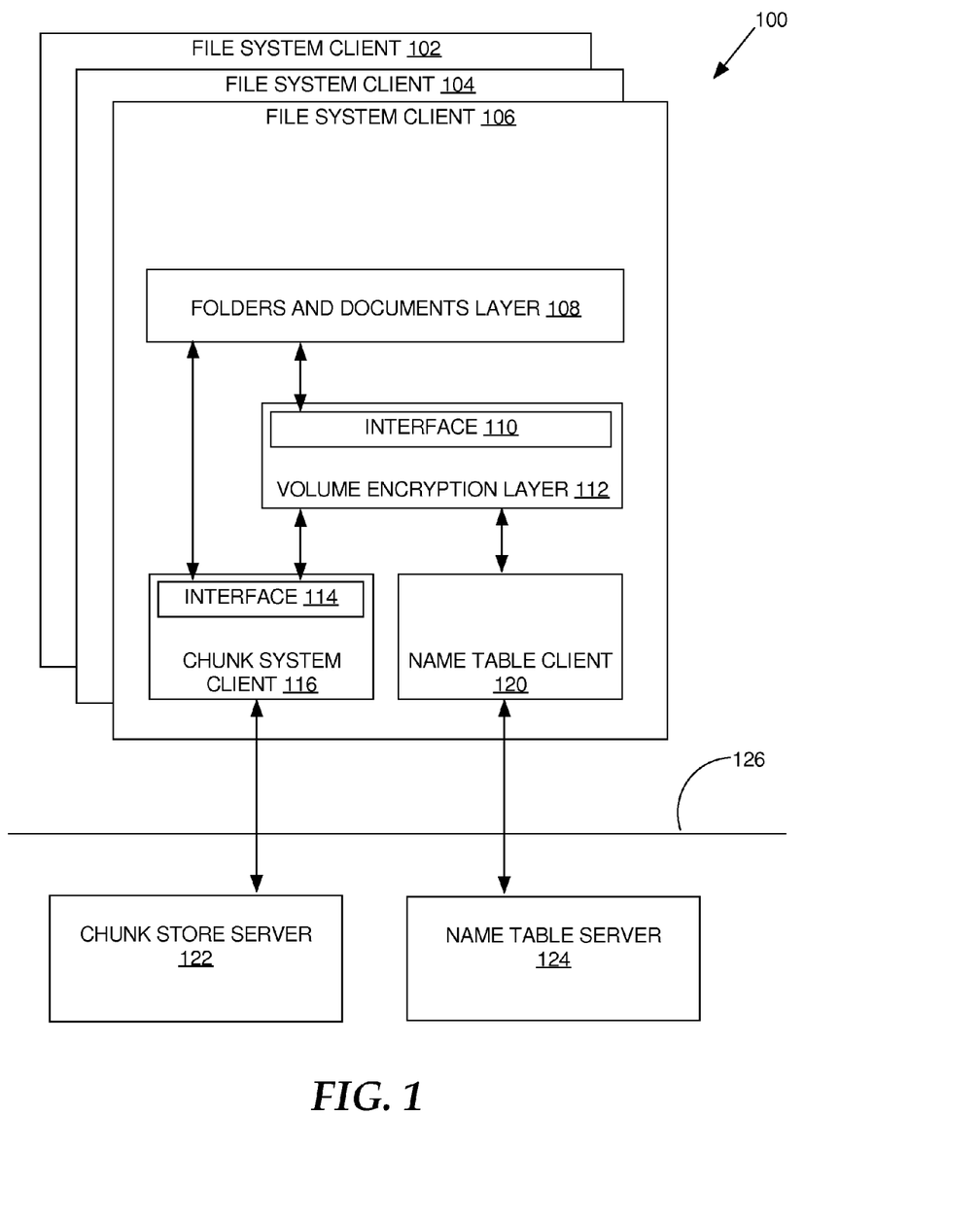
FIG. 1 is a block diagram depicting an embodiment of a system for chunk-level client side encryption in hierarchical content addressable storage systems.

FIG. 1 is a block diagram depicting an embodiment of a system for chunk-level client side encryption. The chunk-level client side encryption may be implemented in one or more hierarchical content addressable storage systems. Volume management system 100 is configured to implement encryption, storage and access for one or more encrypted volumes. In one embodiment, volume management system 100 is also configured to implement storage and access for one or more non-encrypted volumes.

Volume management system 100 includes one or more file system clients 102-106, a chunk store server 122 and a name table server 124. Each of these components of volume management system 100 shall be described in greater detail hereafter.

File System Clients

File system clients 102-106 generally represent entities configured to store and access files in a file system implemented using chunk store server 122. Thus, file system clients 102-106 may correspond to individual users, applications, user groups, systems, services, or any other type of entity that makes use of a file system. When storing files on an encrypted volume, file system clients 102-106 perform encryption and decryption of chunk data stored by chunk store server 122. In one embodiment, file system clients 102-106 are involved in the implementation of one or more key management schemes for one or more encrypted volumes.

Each of file system clients 102-106 may be authorized to access an encrypted volume when it possesses one or more cryptographic keys granted under a key management scheme for the encrypted volume. Volume management system 100 may implement the same key management scheme for all encrypted volumes. Alternatively or in addition, different encrypted volumes may have different key management schemes.

File system clients 102-106 are configured to access one or more encrypted volumes stored by chunk store server 122. For the purpose of explanation, internal functional units of file system client 106 are illustrated in detail. While not separately illustrated, file system clients 102 and 104 may have the same or similar components.

As illustrated, file system client 106 includes a folders and documents layer 108, a volume encryption layer 112, a chunk system client 116, and a name table client 120. File system client 106 may be configured to access both encrypted and non-encrypted volumes. In one embodiment, file system client 106 accesses volumes stored by chunk store server 122 through folders and documents layer 108. Users and applications may access the remotely stored volumes through the folders and documents layer 108. In one embodiment, folders and documents layer 108 presents a volume obtained from chunk store server 122 as a set of folders and documents in a traditional hierarchical file system.

Name table client 120 is configured to communicate with name table server 124. For example, name table client 120 may communicate with name table server 124 to obtain the hash of the serialized volume state of the encrypted volume. In one embodiment, name table client 120 communicates with name table server 124 to update serialized volume state information.

Volume encryption layer 112 may make calls to an interface of name table client 120. In one embodiment, name table client 120 is an integrated component of volume encryption layer 112. Volume encryption layer 112 is described in greater detail hereafter.

Chunk Store Server

Chunk store server 122 is a content addressable storage system configured to store a plurality of chunks. Although a single block is shown, chunk store server 122 may comprise any number of servers, data stores, network, or any other components suitable for implementing a data storage system. In one embodiment, chunk store server 122 is a cloud server. In one embodiment, chunk store server 122 is configured to communicate with file system client 106 over one or more networks 126.

Chunk store server 122 is configured to store chunks that are accessible using an access key based on the chunk content. The access key may be a hash of the chunk data. For example, $h(C_{CT})$ is the access key used to access a clear-text chunk stored by chunk store server 122, while $h(C_E)$ is the access key used to access an encrypted chunk stored by chunk store server 122. In one embodiment, the hash function is an immutable hash function. That is, the application of the hash function to a given chunk always produces the same access key. Examples of hash functions that may be used for generating the access keys include, but are not limited to, MD5, SHA-1 and SHA-2.

Volume Encryption Layer

Data protection in an encrypted volume may be implemented using the volume encryption layer 112. Volume encryption layer 112 handles encryption, decryption, potentially one or more aspects of key management, and other functions related to security of an encrypted volume. In one embodiment, volume encryption layer 112 is configured to access chunk store server 122 through an interface 114 of chunk system client 116.

Volume encryption layer 112 may make calls to chunk system client 116 to communicate with chunk store server 122. Under this configuration, for access of non-encrypted volumes, folders and documents layer 108 calls chunk system client 116 through interface 114. For access of encrypted volumes, folders and documents layer 108 calls volume encryption layer 112 through interface 110, which in turn calls chunk system client 116 through interface 114.

Volume encryption layer 112 calls chunk system client 116 through interface 114 to communicate with chunk store server 122. Chunks passed between volume encryption layer 112 and chunk system client 116 are encrypted chunks. For example, if volume encryption layer 112 executes a get operation, chunk system client 116 returns an encrypted chunk that is decrypted at the volume encryption layer 112. If volume encryption layer 112 executes a put operation, volume encryption layer 112 passes chunk system client 116 an already-encrypted chunk.

The Chunk System Client

Chunk system client 116 is configured to communicate with chunk store server 122 to access chunk data stored by chunk store server 122, including encrypted chunks and non-encrypted chunks. Chunk system client 116 may be an existing client configured to access non-encrypted volumes. In one embodiment, chunk system client 116 is configured to communicate with chunk store server 122 over one or more networks 126. In one embodiment, chunk system client 116 does not handle encryption, decryption, key management, or other functions related to security of an encrypted volume. Rather, these functions are handled by volume encryption layer 112.

Name Table Server

In one embodiment, volume management system 100 further includes name table server 124. Name table server 124 is configured to store a mapping between a volume identifier of an encrypted volume and volume state data. The mapping may be serialized and/or stored in the same chunk store as one or more encrypted chunks. Name table server 124 is shown conceptually as a block in the volume management system 100, name table server may be partially and/or fully integrated into chunk store server 122. In one embodiment, name table server 124 is configured to maintain a Name to Hash Map that maps a volume identifier of an encrypted volume to a hash of its serialized volume state data. The hash of the serialized volume state data may be used to obtain a stored chunk containing the serialized volume state data from a chunk store, which may be the same chunk store or a different chunk store from chunk store server 122. In one embodiment, name table server 124 is configured to communicate with file system client 106 over one or more networks 126.

Example Interfaces

For operations involving data stored on an encrypted volume, folders and documents layer 108 makes calls to interface 110 of volume encryption layer 112. For operation involving data stored on an unencrypted volume, folders and documents layer 108 makes calls to interface 114 of chunk system client 116.

In one embodiment, interface 110 and interface 114 expose a common interface, allowing encrypted volume support with minimal modifications to the folders and documents layer 108. For example, in one embodiment, both chunk system layer interface 114 and volume encryption layer interface 110 support the following calls:

get(volume, access key)—requests retrieval of the chunk associated with the specified access key;

put(volume, content)—requests storage, as a chunk, of the specified content;

For the purpose of explanation, "get" calls made to the chunk system layer interface 114 shall be labeled as chunk_store_get( ) calls, while "get" calls made to the encryption layer interface 110 shall be labeled as encrypted_volume_get( ) calls. Similarly, "put" calls made to the chunk system layer interface 114 shall be labeled as chunk_store_put( ) calls, while "put" calls made to the encryption layer interface 110 shall be labeled as encrypted_volume_put( ) calls.

These are merely examples of the types of functions that may be invoked through chunk system layer interface 114 and/or volume encryption layer interface 110. The techniques described herein are not limited to any particular functions or the specific parameters thereof.

For data that belongs to unencrypted volumes, folders and documents layer 108 calls interface 114 directly. For data belonging to encrypted volumes, volume encryption layer 112 serves as a "middle-man" between folders and documents layer 108 and chunk system client 116.

For example, for put operations involving unencrypted data, folders and documents layer 108 calls chunk_store_put with the unencrypted chunk data. For put operations involving an encrypted volume, folders and documents layer 108 calls encrypted_volume_put, also with the unencrypted chunk data. In response to the call, the volume encryption layer 112 encrypts the chunk data, and then calls chunk_store_put with the encrypted chunk data.

For get operations involving unencrypted data, folders and documents layer 108 calls chunk_store_get with the hash of the unencrypted chunk data. For put operations involving an encrypted volume, folders and documents layer 108 calls encrypted_volume_put, also with the hash of the unencrypted chunk data. In response to the call, the volume encryption layer 112 determines the hash of the encrypted chunk data, and then calls chunk_store_put with the hash of the encrypted chunk data.

Thus, as illustrated by these examples, the folders and documents layer 108 need only deal with unencrypted elements (the unencrypted chunk data and the hash of the unencrypted chunk data), even when dealing with data stored on an encrypted volume.

Volume Hash Tree

Figure 2A:
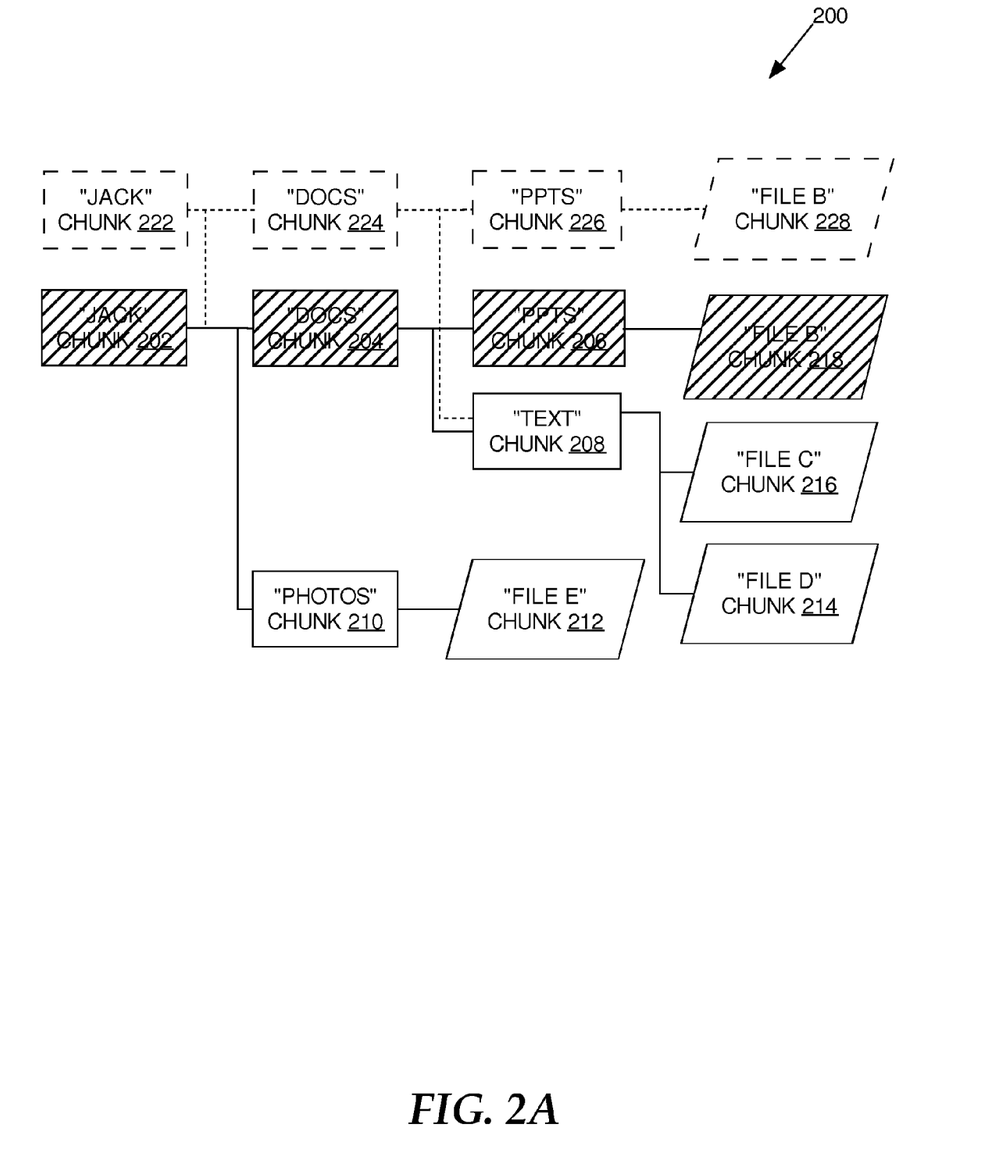
FIG. 2A is a block diagram depicting an embodiment of a hash tree corresponding to an encrypted volume.

Chunks may be used to represent a file system hierarchy of a volume, where some chunks correspond to folders/directories of the file system hierarchy, and other chunks correspond to files that are stored in those folders/directories. FIG. 2A is a block diagram depicting an embodiment of a hash tree corresponding to an encrypted volume. The hierarchical relationship illustrated in FIG. 2 has no overlapping trees. However, it is also possible for any given chunk or sub-tree of chunks to belong to multiple trees within the hierarchy. The techniques described herein are equally applicable to chunk stores that represent such hierarchies as chunk stores that represent non-overlapping tree hierarchies.

Volume 200 is represented as a tree that includes chunks arranged in a manner that reflects the hierarchical relationship between the files stored in volume 200. Documents 212-218 are represented by leaf-nodes within the tree. For example, in the hierarchy, a file B resides in the directory "PPTS" which is a child of the directory "DOCS", which in turn is a child of the directory "JACK", which is the root directory for Jack's account. Consequently, the chunk 218 that corresponds to File B is shown as a child of chunk 206 that corresponds to directory "PPTS". Similarly, chunk 206 is shown as a child of chunk 204 that corresponds to directory "DOCS", and chunk 204 is shown as a child of chunk 202 that corresponds to root directory "JACK". Chunk 202 is a root chunk of the tree corresponding to the volume 200.

When a chunk is a non-leaf chunk of the hash tree of the volume, the chunk may include data identifying one or more child chunks. For example, in a content addressable storage system, the non-leaf chunk may include content information usable to locate the one or more child chunks. For example, the non-leaf chunk may include a hash of each child chunk, i.e. $h(C_{CT})$ for each child chunk. In an encrypted volume, the child chunks are encrypted chunks, and the non-leaf chunk includes a hash of the encrypted child chunks, i.e. $h(C_E)$ or other information that may be used to obtain $h(C_E)$. In one embodiment, the non-leaf chunks include $h(C_{CT})$ for the encrypted child chunks, which may be mapped to $h(C_E)$ by volume encryption layer 112.

While the arrangement of chunks in the tree reflects the hierarchical relationship between the files to which the chunks correspond, the actual arrangement of the chunks within a chunk store may have no relationship to that hierarchy. For example, the chunks may be randomly distributed across several storage devices. Thus, the tree corresponding to volume 200 is merely to facilitate understanding of the techniques described herein.

When a file system hierarchy is implemented using a chunk store, the addition or modification of a single file may necessitate changes to every file that is above that file in the hierarchy. Specifically, because the files are implemented by chunks that are addressed based on content, the modification of the single file causes creation of new chunks for every file that is above the file in the hierarchy.

For example, assume that a user updates file B. Because the update to file B changes the content of the chunk, and chunks are addressed based on content, the new chunk is not simply stored over the chunk 218 that had the prior version of file B. Rather, the modified version of file B constitutes new chunk 228, which is stored separate from chunk 218.

Because File B is stored in new chunk 228, chunk 206 that corresponds to the directory "PPTS" in which File B resides must also be updated to point to the new chunk for File B. The updated file for the directory "PPTS" is stored as new chunk 226. Similarly, the chunk 204 that corresponds to the directory "DOCS" that is the parent of "PPTS" must also be updated to point to the new chunk for the "PPTS" directory. The updated file for "DOCS" is stored as new chunk 224. For similar reasons, new chunk 222 is stored for the root directory "JACK" that is the parent of "DOCS".

As a consequence of the update to file B, several chunks have become "stale". A stale chunk is a chunk whose data no longer reflects the current state of the file system. In the example given above, the update to file B causes chunks 202, 204, 206 and 218 to become stale. The more updates that are performed, the more chunks become stale.

Chunk Encryption

Chunk store server 122 is configured to store chunks in one or more encrypted volumes. The chunk storage system may also store chunks belonging to one or more unencrypted volumes. A chunk may be encrypted by a client entity using a chunk key (CK) before the chunk is stored in the chunk storage system. The chunk key CK will depend on the encryption scheme of the encrypted volume, as described below. However, the chunk key CK cannot be derived by an entity who does not possess the volume key (VK) for the encrypted volume. A key-management scheme is used to control access of the clear-text chunk data associated with one or more encrypted chunks stored in the chunk store system.

In one embodiment, encryption is implemented by a client-side layer, such as volume encryption layer 110. Volume encryption layer 110 may be configured to use one or more encryption schemes. Three examples of suitable encryption schemes are provided. These are merely examples of encryption and key-management schemes that may be implemented in a system for chunk-level client side encryption in hierarchical content addressable storage systems. The techniques described herein are not limited to any particular functions, or the specific parameters thereof.

Chunk-Level Random Encryption Scheme

In the chunk-level random encryption scheme, the chunk key (CK) is a random key which is generated for each encrypted chunk. In one embodiment, the random key is generated by the entity encrypting the chunk, such as the volume encryption layer of a client. This chunk-specific chunk key is then encrypted with the volume key VK of the volume associated with the chunk.

In one embodiment, the chunk key is stored in a table mapping chunk data to encrypted data comprising the chunk key. For example, the hash of the clear-text chunk data is mapped to the chunk key encrypted using the volume key, i.e. $H(C_{CT}) \rightarrow E(VK, CK)$.

Volume Key Encryption Scheme

In the volume key encryption scheme, all the chunks logically stored in a volume are encrypted with the volume key VK of the encrypted volume. The chunk key (CK) of all chunks in the encrypted volume is the volume key VK. In one embodiment, a new random initialization vector is chosen for encryption of each chunk.

Clear-Text Hash Encryption Scheme

In the clear-text hash encryption scheme, the clear-text chunk hash, $h(C_{CT})$, is used as the chunk key to encrypt each chunk. In one embodiment, a cryptographically strong hashing algorithm, such as SHA2, is used. Under the clear-text hash encryption scheme, encryption is content dependent. Thus, two different devices encrypting the same content will produce the same encrypted bits. In one embodiment, the content-dependent property of the clear-text hash encryption scheme is used for de-duplication of content stored in a chunk server, which may include the de-duplication of content belonging to different volumes.

Encrypted Volume State

Figure 2B:
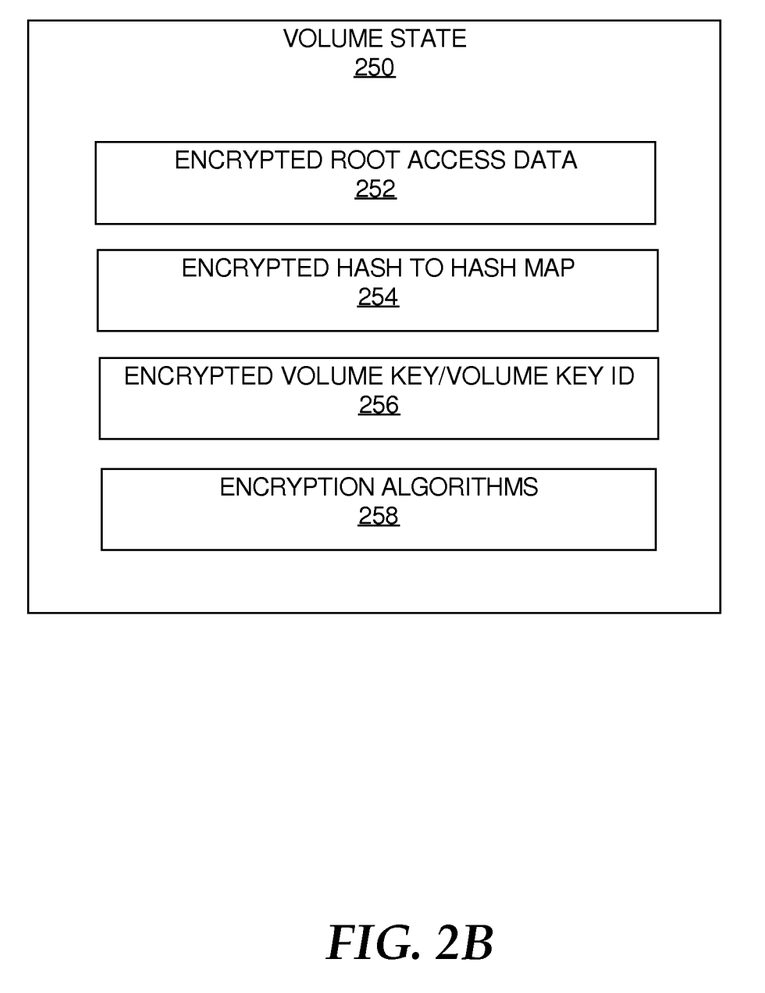
FIG. 2B is a block diagram depicting a volume state.

A volume state (VS) includes data necessary for accessing an encrypted volume and managing access to the encrypted chunks of the encrypted volume. FIG. 2B is a block diagram depicting data contained in a volume state for an encrypted volume.

Hash to Hash Map

Volume state 250 may include Hash to Hash Map 254. Hash to Hash Map 254 is a mapping between the hash of the clear-text chunk data, $h(C_{CT})$, and the hash of the corresponding encrypted chunk data, $h(C_E)$. This map is important because the calls received by volume encryption layer 112 from the folders and documents layer 108 will reference chunks using the hash of the clear-text chunk data, and volume encryption layer 112 must respond to 'those calls by accessing the corresponding encrypted chunks using the hash of the encrypted chunk data. For example, assume that the hash of the unencrypted version of a chunk is H1, and the hash of the encrypted version of the same chunk is H2. Under these circumstances, the Hash to Hash Map 254 would contain an entry that maps H1 to H2.

Hash to Hash Map 254 may be stored as a table. Hash to Hash Map 254 may be used to lookup the access key to an encrypted chunk given the access key to the unencrypted version of the same chunk, and vice versa. In one embodiment, Hash to Hash Map 254 maps a double hash of the clear-text chunk data, $h(h(C_{CT}))$, to the hash of the encrypted chunk data, $h(C_E)$. In such an embodiment, Hash to Hash Map 254 may still be used to lookup the access key for the encrypted chunk given the access key of the unencrypted chunk e.g. $h(C_{CT})$, but not vice versa. For example, $h(h(C_{CT}))$ may be used to provide additional security under the Clear-Text Hash Encryption Scheme.

In one embodiment, Hash to Hash Map 254 is encrypted with the volume key, VK, when stored in volume state 250. In one embodiment, Hash to Hash Map 254 maps the clear-text chunk data encrypted with the volume key VK E(VK, h($C_{CT}$)) to the hash of the encrypted chunk data, h($C_E$). In one embodiment, Hash to Hash Map 254 maps the double hash of the clear-text chunk data encrypted with the volume key, E(VK, h(h($C_{CT}$))), to the hash of the encrypted chunk data, h($C_E$). In such an embodiment, Hash to Hash Map 254 may still be used to lookup the access key for the encrypted chunk given the access key of the unencrypted chunk e.g. h($C_{CT}$). Where h($C_{CT}$) in clear is stored encrypted with the volume key VK as E(VK, h($C_{CT}$)), additional security may be provided under any of the encryption schemes against attacks which could rely on h($C_{CT}$)) to make inferences about the encrypted data.

Encrypted Root Hash

Volume state 250 includes an encrypted root access data 252. The root access data is required in volume state 250 because the root chunk of the chunk tree contains the access data for all child chunks of the encrypted volume. Typically, an encrypted chunk would be accessed using the hash of the encrypted chunk as the access key, i.e. h($C_E$). However, with the data contained in Hash to Hash Map 254, h($C_{CT}$) is sufficient to access data because the access key h($C_E$) can be obtained using Hash to Hash Map 254. In this case, the root access data is h($RC_{CT}$).

In one embodiment, the encrypted root access data 252 is encrypted with the volume key VK to secure the access data for the root chunk, i.e. E(VK, h($RC_{CT}$)).

In one embodiment, data integrity may also be applied by generating a message authentication code (MAC) or by using an encryption algorithm that also enables integrity protection, such as EAX, CCM, or any other authenticated encryption algorithm.

Encrypted Volume Key E(VK)

In one embodiment, volume state 250 further includes encrypted volume key 256. The volume key is an essential cryptographic key needed to determine the chunk key CK to decrypt encrypted chunks in the encrypted volume. The chunk key CK will depend on the encryption scheme of the encrypted volume. However, the chunk key CK cannot be derived by an entity who does not possess volume key VK. For example: (a) in the chunk-level random encryption scheme, the chunk key (CK) is a random key that is generated for each encrypted chunk, and each chunk key CK is encrypted using the volume key VK; (b) in the volume key encryption scheme, the volume key VK is used as the chunk key CK for any chunk; (c) in the clear-text hash encryption scheme, the chunk keys CK are obtained from a parent chunk in the chunk tree, and the volume key VK is required to obtain the root chunk.

The volume key is encrypted so that only authorized entities may make use of the volume key. In one embodiment, the volume state VS includes one encrypted volume key for each distinct entity authorized to access the encrypted volume. For example, assume that two entities E1 and E2 are authorized to access an encrypted volume. Under these circumstances, the volume state may include one encrypted volume key EVK1 for the entity E1 (encrypted using entity key $K_{E1}$ of entity E1), and another encrypted volume key EVK2 for the entity E2 (encrypted using entity key $K_{E2}$ of entity E2). For a specific entity, $K_E$ may be a public or symmetric key.

Volume Key ID ID(VK)

In one embodiment, Volume state 250 includes only the Volume Key ID and not any form of the actual Volume Key. The Volume Key ID may be a cryptographically secure random number to uniquely identify the Volume Key.

In one embodiment, management and storage of the volume key is done by an external key management component. In one embodiment, when two entities E1 and E2 are authorized to access the encrypted volume, the key management component handles the secure exchange of the Volume Key. The key exchange may be facilitated by public or symmetric key cryptography or other mechanisms using a different channel. Thus, the encrypted volume may be shared without modifying the encrypted volume state. Furthermore, only the encrypted volume key is required to share further as against the entire volume state. This can be used to further strengthen the encrypted volume state against attacks which could rely on the number or identity of users to which the encrypted volume state is shared.

In one embodiment, the volume key is a symmetric key assigned to each individual encrypted volume. VK may be randomly generated for each encrypted volume, such as when the encrypted volume is created. The volume key VK may be used to implement a key-management scheme to secure the data stored in the encrypted volume and to grant access to the encrypted volume to authorized entities. In one embodiment, the volume key VK is generated only on the client side and the server never has access to the unencrypted VK such that the server can never decrypt the encrypted volume.

Encryption Algorithms

In one embodiment, volume state 250 further includes encryption algorithms 258. The volume state may identify one or more algorithms for encryption and decryption of chunks stored in the encrypted volume. The identified encryption algorithm/s may also be used to protected volume metadata, such as other elements of the volume state. In one embodiment, the volume state is stored in the clear, but includes one or more encrypted components.

Name to Hash Mapping

In one embodiment, the volume state for an encrypted volume is serialized and stored in the chunk storage system. For example, volume state 250 may be serialized and stored as a chunk by chunk store server 122 or a separate chunk store server. Under one or more key management schemes, the serialized volume state VS may be stored in clear-text because select components of the serialized volume state are encrypted such that only authorized entities can decrypt the components necessary to access the encrypted volume.

When the serialized volume state VS is stored as a chunk in a chunk storage system, the serialized volume state VS may be accessed using an access key based on the content of the chunk, such as the hash of the serialized volume state, i.e. h(VS).

In one embodiment, a Name to Hash Map is maintained. The Name to Hash Map maps a volume identifier of an encrypted volume to the hash of the serialized volume state, i.e. VID→h(VS). An entity may obtain the volume state for a specified volume using the volume identifier and the Name to Hash Map. The entity may need one or more cryptographic keys to decrypt data stored in the volume state.

Accessing an Encrypted Volume

A file system client may access an encrypted volume when it possesses one or more cryptographic keys granted under a key management scheme for the encrypted volume. In one embodiment, a volume encryption layer is configured to access an encrypted volume by handling chunk encryption and chunk decryption of chunks. The volume encryption layer may make calls to another layer configured to directly communicate with a chunk store server. For example, volume encryption layer 112 is configured to call interface 114 of chunk system client 116, which directly communicates with chunk store server 122.

To access a target volume that is encrypted, an authorized entity E obtains the serialized volume state 250 for the target volume. The serialized volume state 250 includes essential information relating to the target volume, such as the encrypted volume key 256, or the corresponding volume key ID, and the encrypted root chunk 252 of the target volume. The serialized volume state 250 also includes the Hash to Hash Map 254 of the target volume, which is needed to locate the child chunks in the chunk tree of the target volume. The volume key VK may be obtained by decrypting the encrypted volume key with the entity's key $K_E$. The encrypted volume key may be stored in the volume state 250 or obtained from the key management component using the volume key ID. The entity then uses the volume key VK to decrypt the encrypted components of volume state 250.

Figure 3:
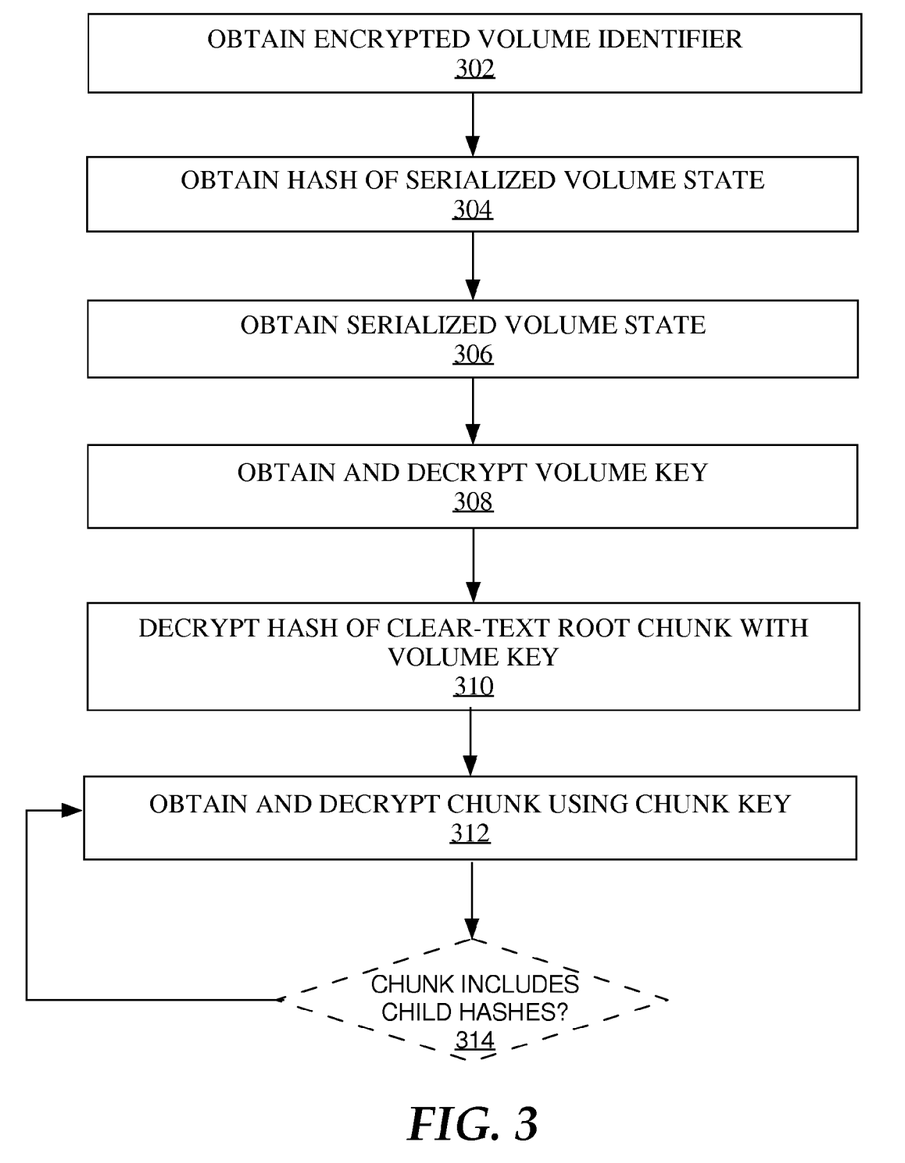
FIG. 3 is a flowchart illustrating an embodiment of a method for obtaining the root hash of a chunk tree to access an encrypted volume.

FIG. 3 is a flowchart illustrating an embodiment of a method for obtaining the root hash of a chunk tree to access an encrypted volume (the "target volume"). This method is applicable under any encryption scheme, including but not limited to the chunk-level random encryption scheme, volume key encryption scheme, and clear-text hash encryption scheme.

At step 302, a volume identifier (VID) for an encrypted volume is obtained by an authorized entity E. Entity E may be a file system client 106 that has been granted access under a key management scheme. In one embodiment, entity E is granted access by updating a stored serialized volume state VS associated with the target volume to include the volume key encrypted with the key of the authorized entity, i.e. $E(K_E, VK)$. Any other authorized entity E' may authorize entity E by updating the stored serialized volume state VS, such as volume state 250. In one embodiment, entity E is granted access by using a key management component to securely exchange the Volume Key with the authorized entity. The volume key ID is used to identify the applicable key. Any other authorized entity E' may authorize a new entity E by the same mechanism.

At step 304, entity E obtains the hash of the serialized volume state (i.e. h(VS)) of the target volume. Entity E may obtain the hash of the serialized volume state, based on the volume identifier VID, using the Name to Hash Map. For example, the volume encryption layer 112 of entity E may make a call to name table client 120. The call would include the volume identifier VID. In response to receiving the call, the name table client 120 locates the entry for the volume identifier VID. That entry maps the volume identifier VID to the hash of the serialized volume state of the target volume h(VS). Having located the hash h(VS), the name table client 120 returns the hash h(VS) to the volume encryption layer 112 as a response to the call.

At step 306, entity E uses the hash h(VS) to obtain the serialized volume state of the target volume, such as volume state 250. In one embodiment, the serialized volume state of the target volume is obtained by performing a get operation to obtain a chunk associated with the hash of the serialized volume state, h(VS). For example, the volume encryption layer 112 of entity E may perform a get operation by making a call to chunk system client 116 for the chunk storing the serialized volume state using its access identifier h(VS). In one embodiment, the serialized volume state 250 of the target volume contains the encrypted volume key 256, the encrypted hash of the clear-text root chunk 252, and the Hash to Hash Map 254 for the target volume.

At step 308, entity E decrypts the encrypted volume key (VK) 256 of the target volume using the entity's key $K_E$. The encrypted volume key 256 is stored in the serialized volume state 250 of the target volume. In one embodiment, encrypted volume key 256 is encrypted with the key of the authorized entity, i.e. $E(K_E, VK)$. The encrypted volume key 256 may be stored in the serialized volume State 250 or obtained from the key management component using the Volume Key ID.

At step 310, entity E decrypts the encrypted root access data 252 of the target volume using the decrypted volume key VK. The encrypted root access data 252 is stored in the serialized volume state 250 of the target volume. The encrypted root access data 252 may be encrypted using any of the encryption schemes for Hash to Hash Map 254 for the target volume. In one embodiment, the serialized volume state 250 of the target volume contains the Volume Key ID 256, the encrypted hash of the clear-text root chunk 252, and the Hash to Hash Map 254. In one embodiment, the encrypted root access data 252 is the hash of the clear-text root encrypted with the volume key of the target volume, i.e. $E(VK, h(RC_{CT}))$.

At step 312, entity E obtains and decrypts the root chunk using the unencrypted root access data from step 310. The unencrypted root access data includes a chunk key for the root chunk. In one embodiment, the root access data is $h(RC_{CT})$, and the root chunk is obtained by: (a) obtaining $h(RC_E)$ from Hash to Hash Map 254 using $h(RC_{CT})$; (b) performing a get operation using $h(RC_E)$ to obtain the encrypted root chunk $RC_E$; and (c) decrypting the root chunk $RC_E$ in accordance with the encryption scheme of the encrypted volume (e.g. the chunk-level random encryption scheme, volume key encryption scheme, clear-text hash encryption scheme, or another suitable encryption scheme). Step 312 is described in more detail at FIG. 4.

At optional step 314, if the chunk includes child hashes, child chunks in the hierarchy of the encrypted volume are recursively processed, such as by recursively performing step 312. In a chunk storage system, a hierarchical file system may be represented using chunks that represent non-leaf nodes and chunks that represent leaf nodes. A chunk that represents a non-leaf node contains the hashes of chunks that represent its child nodes. For example, in FIG. 2, the root chunk 202 of volume 200 may contain the hashes of child chunks 204 and 206. In a volume encrypted using the clear-text hash encryption scheme, a hash of a descendant may be used to locate the descendant chunk as well as to decrypt the descendant chunk. In one embodiment, the child hashes are hashes of the clear-text chunk data of child chunks, i.e. $h(C_{CT})$.

In one or more alternative embodiments, if the volume identifier VID is not encrypted, an unauthorized entity E' possessing the clear-text volume identifier VID would not be able to access the target volume. Even if the unauthorized entity E' obtains the clear-text serialized volume state using its hash (obtained using the Name to Hash Map), the unauthorized entity E' would not be able to decrypt critical information in the serialized volume state that is encrypted, such as the volume state encrypted with the key of authorized entities E.

Get Operation

Figure 4:
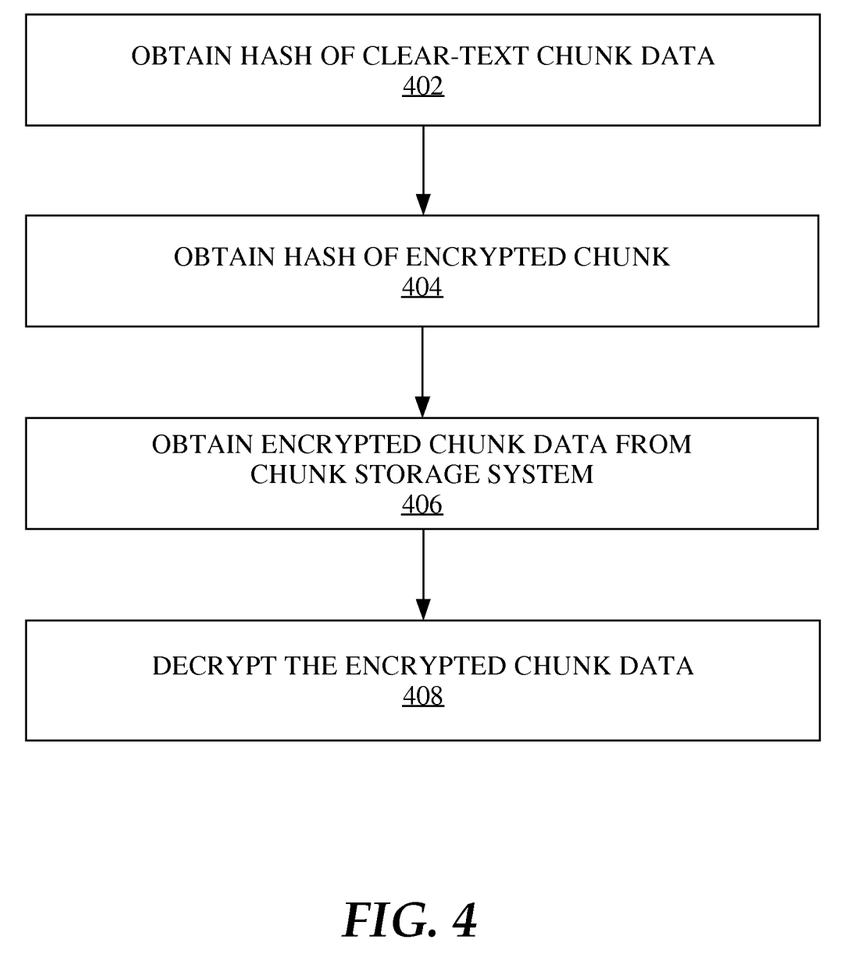
FIG. 4 is a flowchart illustrating an embodiment of a method for a get operation to obtain a specified chunk.

A chunk in an encrypted volume may be retrieved from the chunk storage system using a get operation. In one embodiment, a get operation for an encrypted chunk is implemented in an encrypted volume layer configured to use the volume key VK for the encrypted volume to derive the chunk key CK and decrypt the encrypted chunk using the chunk key CK. The get operation for the encrypted chunk may call a get operation implemented in a chunk system layer configured to handle chunk data based on content, regardless of whether the chunk data is encrypted.

To perform a get operation for a chunk C in a volume encryption layer such as volume encryption layer 112, an access key and a chunk key CK are needed. The access key is used to locate C in the chunk storage system. In one embodiment, the access key is a hash of the encrypted chunk $C_E$. The chunk key CK is used to generate the clear-text chunk data $C_{CT}$ by the decryption operation D (K, $C_E$). The value of the chunk key CK depends on the encryption scheme for the volume, which may be selected from the chunk-level random encryption scheme, volume key encryption scheme, clear-text hash encryption scheme, or another suitable encryption scheme.

FIG. 4 is a flowchart illustrating an embodiment of a method for a get operation to obtain a specified chunk. The get operation may be performed by an authorized entity E.

At step 402, entity E obtains a hash of the clear-text chunk data. For example, for a root chunk of the target volume, the hash of the clear-text chunk data may be obtained from a serialized volume state 250 of the target volume. For a child chunk in a chunk tree of the target volume, the hash of the clear-text chunk data may be obtained from a parent chunk.

At step 404, entity E obtains a hash of the encrypted chunk. The hash of the encrypted chunk may be obtained using the Hash to Hash Map 254 of the encrypted volume, such as a Hash to Hash Map 254 stored in a serialized volume state 250.

At step 406, entity E obtains an encrypted chunk from a chunk storage system such as chunk store server 122. The hash of the encrypted chunk is used to obtain the encrypted chunk from a chunk store server 122. In one embodiment, a volume encryption layer 112 of entity E makes a call to a chunk system client 116 configured to request the chunk from chunk store server 122.

At step 408, entity E decrypts the encrypted chunk data, resulting in the clear-text chunk data. In one embodiment, the volume encryption layer 112 of entity E decrypts an encrypted chunk returned by chunk system client 116. Decryption may be carried out using the appropriate chunk key CK in accordance with an encryption scheme of the encrypted volume, such as the chunk-level random encryption scheme, volume key encryption scheme, clear-text hash encryption scheme, or another suitable encryption scheme.

Put Operation

Figure 5:
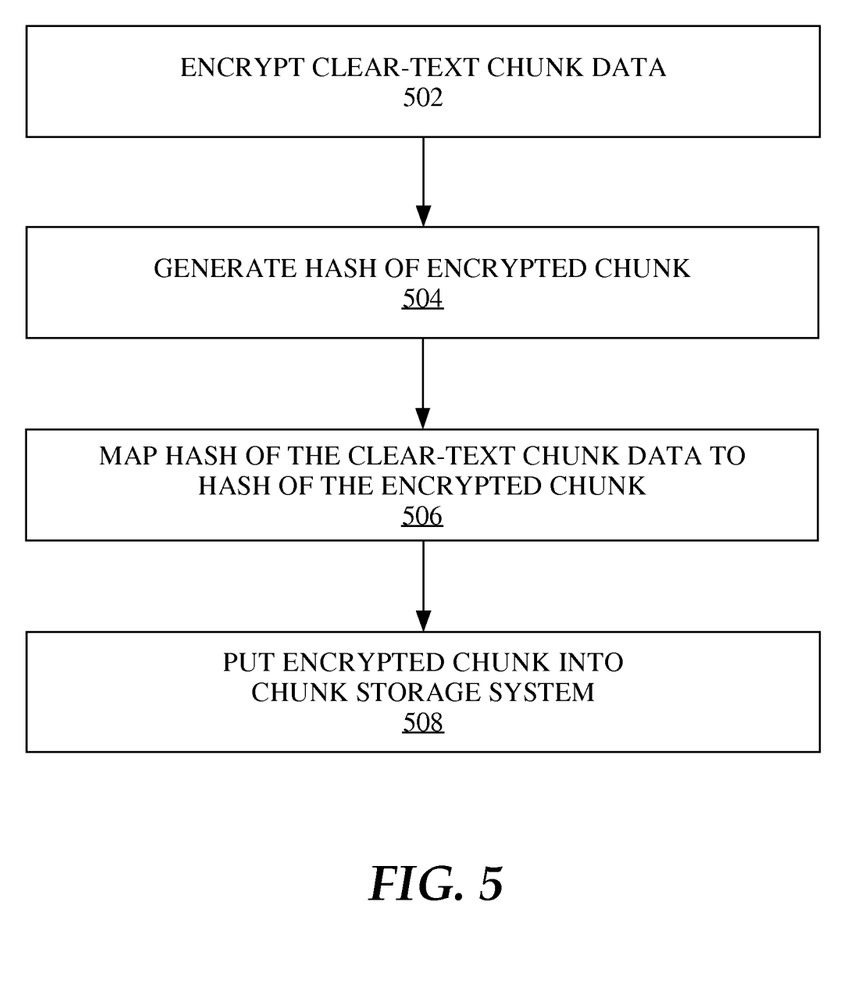
FIG. 5 is a flowchart illustrating an embodiment of a method for a put operation to add a specified chunk to an encrypted volume.

A chunk may be added to an encrypted volume in a chunk storage system using a put operation. In one embodiment, a put operation for an encrypted volume is implemented in an encrypted volume layer configured to encrypt the chunk using a chunk key CK selected in accordance with a key-management scheme, then put the encrypted chunk into encrypted volume of the chunk storage system. The put operation for the encrypted chunk may call a put operation implemented in a chunk system layer configured to handle chunk data based on content, regardless of whether the chunk data is encrypted.

To perform a put operation for a chunk C in encrypted volume V, C must be encrypted with an appropriate encryption key K in an encryption operation E (K, $C_{CT}$) to generate $C_E$, which is put into the chunk storage system in accordance with the content addressable storage system. In addition, affected chunks in volume V must be updated, including the volume root $R_V$. The value of the encryption key K depends on the encryption scheme for the volume, which may be selected from the chunk-level random encryption scheme, volume key encryption scheme, the clear-text hash encryption scheme, or another suitable encryption scheme.

FIG. 5 is a flowchart illustrating an embodiment of a method for a put operation to add a specified chunk to an encrypted volume. The put operation may be performed by an authorized entity E.

At step 502, entity E encrypts clear-text chunk data. In one embodiment, clear-text chunk data is encrypted by volume encryption layer 112 of entity E. Encryption may be carried out using a selected chunk key CK in accordance with an encryption scheme of the encrypted volume, such as the chunk-level random encryption scheme, volume key encryption scheme, clear-text hash encryption scheme, or another suitable encryption scheme.

At step 504, a hash of the encrypted chunk is generated.

At step 506, the hash of the clear-text chunk data is mapped to the hash of the encrypted chunk. In one embodiment, this mapping is added to the Hash to Hash Map 254 of the volume state. In one embodiment, the Hash to Hash Map 254 of the volume state is maintained in memory until re-serialization of the volume state is triggered to store a serialized volume state 250 as a chunk. Under the Chunk-Level Random Encryption Scheme, the hash of the clear-text chunk data is mapped to the chunk key encrypted with the volume key, i.e. $h(C_{CT}) \rightarrow E$ (VK, CK) to securely store the chunk key associated with each chunk.

At step 508, the encrypted chunk is put into the chunk storage system. In one embodiment, a volume encryption layer 112 of entity E makes a call to a chunk system client 116, which puts the encrypted chunk into the chunk store by communicating with the chunk store server 122.

Updating the Hash Tree

After a put operation or other mutation of the data in an encrypted volume, the data hash tree may be modified to trigger updating of one or more non-leaf chunks and an update to the volume state. An update to the volume state requires re-serialization of the volume state, which involves storing a new chunk corresponding to the new serialized volume state and updating the hash of the new serialized volume state in the Name to Hash Table.

Key-Management for Sharing

In one embodiment, an encrypted volume stored in the chunk storage system may be shared using a key-management scheme. In one embodiment, encrypted content stored in the chunk storage system is decrypted by a client possessing one or more applicable cryptographic keys under the key-management scheme for the encrypted volume. These keys can either be symmetric keys or a public/private key pair. In one embodiment, a key-management scheme for an encrypted volume involves implementing key sharing by one or more client entities.

For example, in one embodiment, when an authorized entity is granted access to an encrypted volume, the volume key VK is encrypted with the key of the entity, i.e. $E(K_E, VK)$ for entity E. From a cryptographic standpoint, any entity which has access to the volume key VK can perform this operation. After this transaction is committed, entity E may access the encrypted volume, decrypt the volume key VK and therefore the whole encrypted volume.

It is possible to revoke access to the encrypted volume by a particular entity E' by changing the volume key VK to a new volume key VK'. The new volume key VK' may be encrypted with the keys of all authorized entities, leaving out the key of revoked entity E'. In one embodiment, access by entity E' may be revoked by changing the volume key VK' such that no chunk in the encrypted volume needs to be re-encrypted.

Implementation details changing entity authorization vary depending on the encryption scheme of the encrypted volume. Additional details are given for the three example encryption schemes discussed herein:

Chunk-Level Random Encryption Scheme

In the chunk-level random encryption scheme, each chunk-specific chunk key CK is encrypted with the volume key VK of the encrypted volume associated with the chunk, i.e. E(VK, CK). In this case, both the original volume key VK and the new volume key VK' are used to access chunks in the encrypted volume. The chunk keys CK used to encrypt new chunks added to the encrypted volume are encrypted with the new volume key, i.e. E(VK', CK). The encrypted chunk key may include an identifier identifying the specific volume key used to encrypt the chunk key. Both the original volume key VK and the new volume key VK' need to be encrypted with the remaining entity keys. After access of a particular entity E' is revoked, the entity E' will not be able to access new data in the encrypted volume. In one embodiment, an additional authorization layer may be used to prevent a removed entity E' from accessing the encrypted volume.

Volume Key Encryption Scheme

In this case, both the original volume key VK and the new volume key VK' are used to access chunks in the encrypted volume. The encrypted chunks may contain a header with the identifier of the specific volume key has been used to encrypt it. New chunks added to the encrypted volume are encrypted with the new volume key VK'. After access of a particular entity E' is revoked, the entity E' will not be able to access new data in the encrypted volume. In one embodiment, an additional authorization layer may be used to prevent a removed entity E' from accessing the encrypted volume.

Clear-Text Hash Encryption Scheme

After changing the volume key VK to a new volume key VK', a new root of the hash tree of the volume is generated. The new root hash is encrypted with the new volume key VK'. The new volume key VK' is encrypted with the remaining entity keys.

Copying Encrypted Data Across Volumes

An entity authorized to access an encrypted volume may be authorized to share the encrypted volume or a portion thereof. For example, an authorized entity may wish to share a folder in an encrypted volume. The folder of the encrypted volume may be represented by a sub-tree of the hash tree corresponding to the encrypted volume.

In one embodiment, sharing a hierarchical structure within the encrypted volume may be implemented by copying the data from a first encrypted volume to a second encrypted volume. In one embodiment, the first encrypted volume is personal to a first entity, while the second encrypted volume is a shared encrypted volume shared with one or more other entities. The implementation of an operation to share a folder of the encrypted volume depends on the encryption scheme of the encrypted volume.

Under the clear-text hash encryption scheme, this operation may be executed by inserting the sub-set of the map of the first encrypted volume corresponding to the folder into the map of the destination volume. This operation requires downloading the non-leaf chunks of the sub-tree to obtain and enumerate the hashes of the sub-tree. No re-encryption of chunks of the sub-tree is necessary.

In one embodiment, under one or more other encryption schemes, this operation may be executed by downloading the chunks of the sub-tree corresponding to the folder, decrypting the chunks, re-encrypting the chunks with one or more appropriate cryptographic keys associated with the second encrypted volume, and putting the re-encrypted chunks into the second encrypted volume.

Sharing a Read-Only Copy

In one embodiment, an authorized entity may wish to share an immutable copy of a sub-tree in an encrypted volume. For example, the sub-tree may correspond to a folder or other hierarchical structure in the volume. The implementation of an operation to share an immutable copy of a sub-tree of the encrypted volume depends on the encryption scheme of the encrypted volume.

Under the clear-text hash encryption scheme, a sub-tree may be shared with an entity E by sharing the clear-text hash of the sub-tree root encrypted with E's key, i.e. $h(K_E, C_{CT})$, along with at least a relevant portion of the Hash to Hash Map corresponding to the relevant chunks in the sub-tree of the original encrypted volume. No re-encryption of chunks of the sub-tree is necessary.

In one embodiment, under one or more other encryption schemes, this operation may be executed by downloading the chunks of the sub-tree corresponding to the folder, decrypting the chunks, re-encrypting the chunks with one or more appropriate cryptographic keys associated with the second encrypted volume, and putting the re-encrypted chunks into the a encrypted volume shared with entity E.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
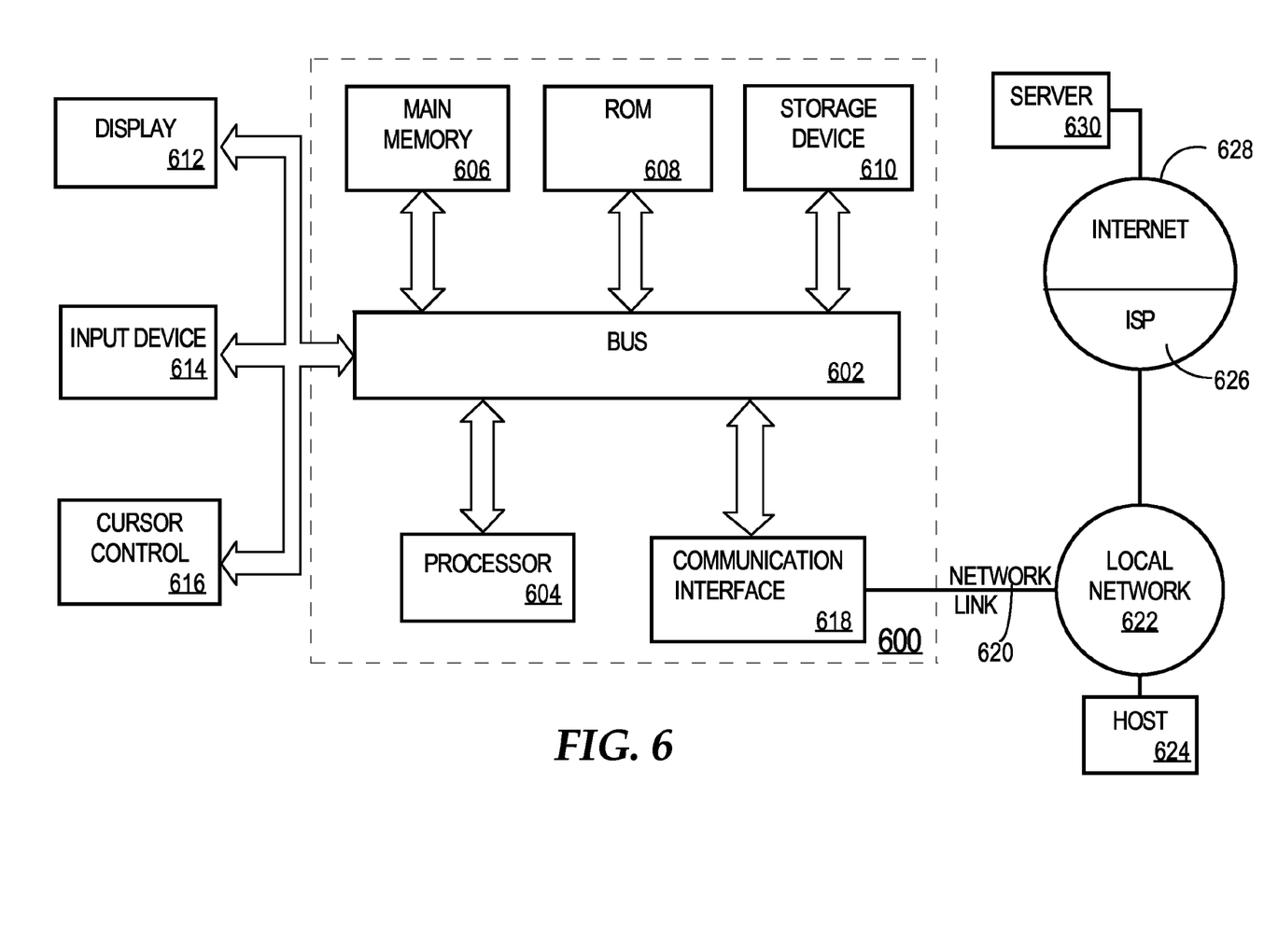
FIG. 6 illustrates a computer system upon which one or more embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    accessing a particular encrypted volume stored as a plurality of encrypted chunks in a content-addressable storage system configured to implement a hierarchical file system that comprises a plurality of encrypted volumes;
    receiving a get request for a particular chunk that resides on the particular encrypted volume of the plurality of encrypted volumes;
    in response to the get request, performing the steps of:
        using a volume key of the particular encrypted volume to decrypt an encrypted root chunk of a chunk tree comprising chunks of the particular encrypted volume;
        using the decrypted root chunk to determine a chunk key of the particular chunk;
        obtaining encrypted chunk data of the particular chunk from the content-addressable storage system;

generating clear-text chunk data by using the chunk key to decrypt the encrypted chunk data of the particular chunk;

responding to the get request with the clear-text chunk data of the particular chunk.

2. The method of claim 1, wherein the chunk key is a random key that is generated for each encrypted chunk.

3. The method of claim 1, wherein the volume key of the particular encrypted volume is the chunk key of the particular chunk.

4. The method of claim 1, wherein the chunk key is a hash of the clear-text chunk data of the particular chunk.

5. The method of claim 1 further comprising:

maintaining, for at least one chunk in the content-addressable storage system, a mapping between a first hash generated based on clear-text chunk data and a second hash generated based on encrypted chunk data.

6. The method of claim 5 wherein the first hash is a double hash of the clear-text chunk data.

7. The method of claim 1 wherein the get request comprises a clear-text chunk hash, the method further comprising:

using the clear-text chunk hash to obtain an encrypted chunk hash;

wherein the encrypted chunk data is obtained using the encrypted chunk hash.

8. The method of claim 1, wherein the encrypted root chunk is obtained from the content-addressable storage system.

9. The method of claim 1 further comprising:

receiving a put request to add a second chunk to the particular encrypted volume;

encrypting the second chunk;

causing storing of the encrypted second chunk in the content-addressable storage system in association with the particular encrypted volume.

10. The method of claim 9 wherein the encrypted second chunk is encrypted using a chunk-specific key unrelated to the content of the encrypted chunk, further comprising the steps of:

encrypting the chunk-specific key using the volume key;

storing the encrypted chunk-specific key in association with a hash generated based on clear-text chunk data of the second chunk.

11. The method of claim 9 wherein the encrypted second chunk is encrypted using the volume key.

12. The method of claim 9 wherein the encrypted second chunk is encrypted using a hash generated based on clear-text chunk data of the second chunk.

13. The method of claim 9 further comprising updating the chunk tree associated with the volume by generating at least one new chunk using the volume key.

14. The method of claim 1 further comprising:

encrypting the volume key using an entity key of an entity;

sharing the particular encrypted volume by sharing the encrypted volume key with the entity by a key management component, wherein the entity has access to the particular volume by decrypting the volume key using its entity key.

15. The method of claim 1 further comprising:

obtaining serialized volume state data from the content addressable storage system;

wherein the serialized volume state data comprises a Hash to Hash Map and volume key information.

16. The method of claim 15, wherein the volume key information comprises a volume key ID, wherein the volume key is obtained through a key management component using the volume key ID.

17. A non-transitory computer-readable medium storing instructions which, when executed by one or more processors, cause performance of a method comprising:

obtaining at least one volume key for at least one volume of a plurality of encrypted volumes stored in a content addressable storage system implementing a hierarchical file system;

receiving a get request for a particular chunk that resides on the particular encrypted volume of the plurality of encrypted volumes;

in response to the get request, performing the steps of:

using a volume key of the particular encrypted volume to decrypt an encrypted root chunk of a chunk tree comprising chunks of the particular encrypted volume;

using the decrypted root chunk to determine a chunk key of the particular chunk;

obtaining encrypted chunk data of the particular chunk from the content-addressable storage system;

generating clear-text chunk data by using the chunk key to decrypt the encrypted chunk data of the particular chunk;

responding to the get request with the clear-text chunk data of the particular chunk.

18. The non-transitory computer-readable medium of claim 17, wherein the chunk key is a random key that is generated for each encrypted chunk.

19. The non-transitory computer-readable medium of claim 17 wherein the volume key of the particular encrypted volume is the chunk key of he particular chunk.

20. The non-transitory computer-readable medium of claim 17 wherein the chunk key is a hash of the clear-text chunk data of the particular chunk.

21. The non-transitory computer-readable medium of claim 17 further comprising:

maintaining, for at least one chunk in the content-addressable storage system, a mapping between a first hash generated based on clear-text chunk data and a second hash generated based on encrypted chunk data.

22. The non-transitory computer-readable medium of claim 17 wherein the first hash is a double hash of the clear-text chunk data.

23. The non-transitory computer-readable medium of claim 17 wherein the get request comprises a clear-text chunk hash, the method further comprising:

using the clear-text chunk hash to obtain an encrypted chunk hash;

wherein the encrypted chunk data is obtained using the encrypted chunk hash.

24. The non-transitory computer-readable medium of claim 17, wherein the encrypted root chunk is obtained from the content-addressable storage system.

25. The non-transitory computer-readable medium of claim 17 further comprising:

receiving a put request to add a second chunk to the particular encrypted volume;

encrypting the second chunk;

causing storing of the encrypted second chunk in the content-addressable storage system in association with the particular encrypted volume.

26. The non-transitory computer-readable medium of claim 25 wherein the encrypted second chunk is encrypted using a chunk-specific key unrelated to the content of the encrypted chunk, further comprising the steps of:

encrypting the chunk-specific key using the volume key;

storing the encrypted chunk-specific key in association with a hash generated based on clear-text chunk data of the second chunk.

27. The non-transitory computer-readable medium of claim 25 wherein the encrypted second chunk is encrypted using the volume key.

28. The non-transitory computer-readable medium of claim 25 wherein the encrypted second chunk is encrypted using a hash generated based on clear-text chunk data of the second chunk.

29. The non-transitory computer-readable medium of claim 25 further comprising updating the chunk tree associated with the volume by generating at least one new chunk using the volume key.

30. The non-transitory computer-readable medium of claim 25 further comprising:
   encrypting the volume key using an entity key of an entity;
   sharing the particular encrypted volume by sharing the encrypted volume key with the entity by a key management component, wherein the entity has access to the particular volume by decrypting the volume key using its entity key.

31. The method of claim 17 further comprising:
   obtaining serialized volume state data from the content addressable storage system;
   wherein the serialized volume state data comprises a Hash to Hash Map and volume key information.

32. The method of claim 31, wherein the volume key information comprises a volume key ID, wherein the volume key is obtained through a key management component using the volume key ID.

* * * * *